United States Patent [19]

Yoshii et al.

[11] Patent Number: 4,462,273
[45] Date of Patent: Jul. 31, 1984

[54] CHANGE-SPEED APPARATUS FOR A TRACTOR

[75] Inventors: Takashi Yoshii; Yasuyuki Horii, both of Sakai; Tomeaki Tama, Hashimoto, all of Japan

[73] Assignee: Kubota, Ltd., Osaka, Japan

[21] Appl. No.: 315,770

[22] Filed: Oct. 28, 1981

[30] Foreign Application Priority Data

Dec. 5, 1980 [JP] Japan .......................... 55-175082[U]
Mar. 26, 1981 [JP] Japan ........................... 56-43295[U]

[51] Int. Cl.³ .................... F16H 3/02; F16H 37/00; B23D 19/00
[52] U.S. Cl. .................................. 74/745; 74/15.66; 74/15.86; 74/473 R
[58] Field of Search ............... 74/745, 15.2, 15.4, 74/15.6, 15.66, 15.86, 473 R

[56] References Cited

U.S. PATENT DOCUMENTS

| | | | |
|---|---|---|---|
| 2,447,469 | 8/1948 | Spraragen | 74/480 R |
| 3,196,696 | 7/1965 | Ritter | 74/15.88 |
| 3,290,955 | 12/1966 | Keller et al. | 74/473 |
| 3,563,109 | 2/1971 | Glass et al. | 74/480 R |
| 3,566,711 | 3/1971 | Leuenberger | 74/477 |
| 4,273,007 | 6/1981 | Sato et al. | 74/745 |
| 4,294,130 | 10/1981 | Kisaka et al. | 74/15.4 |
| 4,294,131 | 10/1981 | Murayama | 74/15.4 |
| 4,304,141 | 12/1981 | Tone et al. | 74/15.66 |
| 4,351,196 | 9/1982 | Yoshida et al. | 74/15.86 |

FOREIGN PATENT DOCUMENTS 922569 1/1955 Fed. Rep. of Germany ..... 74/15.66

Primary Examiner—Allan D. Herrmann
Assistant Examiner—Bruce F. Wojciechowski
Attorney, Agent, or Firm—Edwin E. Greigg

[57] ABSTRACT

A change-speed apparatus for a tractor for transmitting engine power to running travel apparatuses via a main change-speed mechanism, an auxiliary change-speed mechanism and a forward-and-rearward-travel-shifter mechanism. These mechanisms are arranged in series in fore-and-aft direction of a machine body and a shifter lever for the said forward-and-rearward-travel-shifter mechanism is disposed in juxtaposition to a main change-speed lever for the said main change-speed mechansim.

5 Claims, 6 Drawing Figures

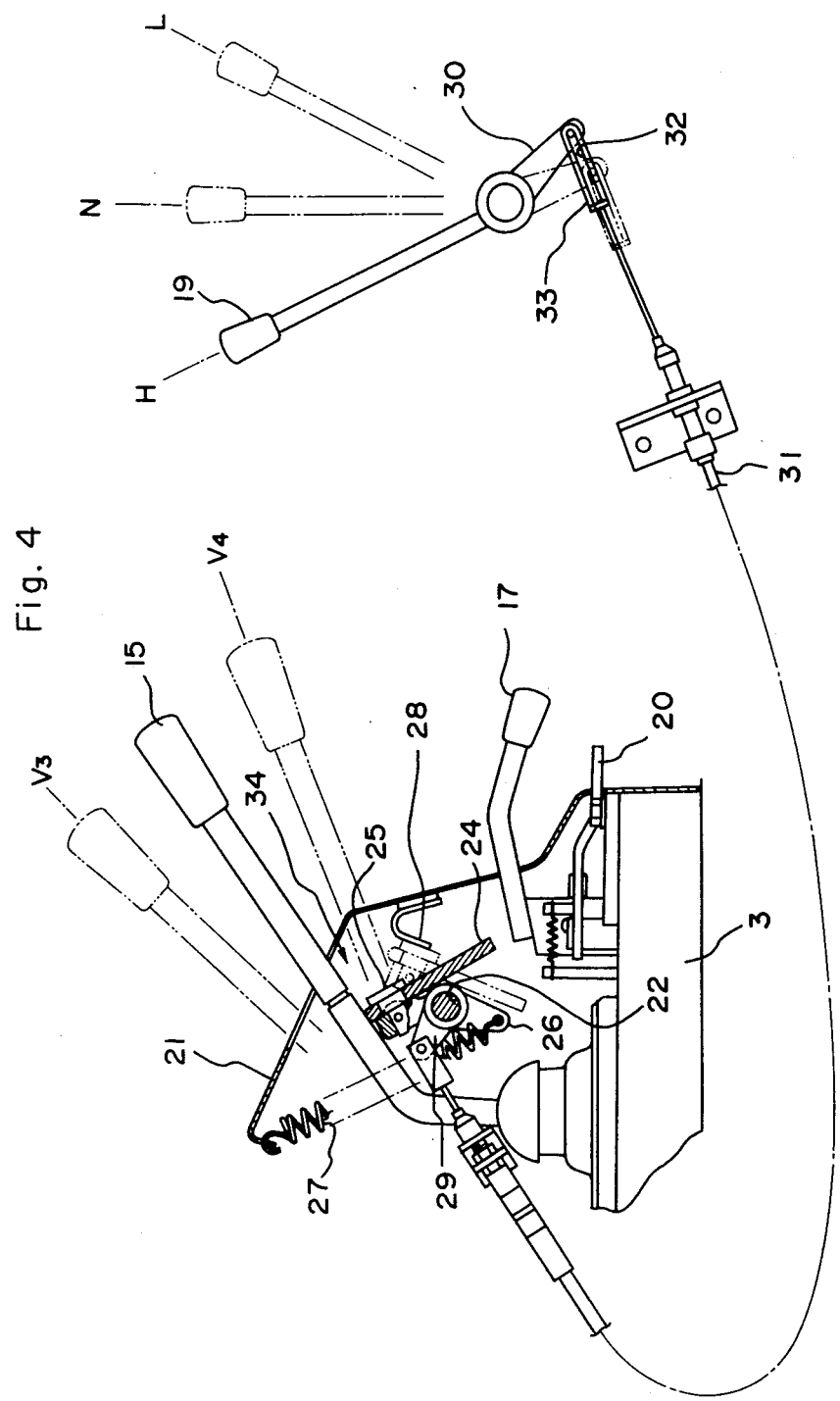

CHANGE-SPEED APPARATUS FOR A TRACTOR

BACKGROUND OF THE INVENTION

1. Field of the Invention

This invention relates to a change-speed apparatus for a tractor, as is constructed for transmitting engine power to running travel apparatuses via a main change-speed mechanism, an auxiliary change-speed mechanism and a forward-and-rearward-travel-shifter mechanism.

2. Description of the Prior Art

It has originally been the general practice to construct the said forward-and-rearward-travel-shifter mechanism as is included in the main change-speed mechanism, as a portion thereof, and to cause same to be maneuvered with a single maneuvering lever provided on the main change-speed mechanism. With such forward-and-rearward-travel-shifter mechanism, being thusly incorporated in the main change-speed mechanism, it has generally been structurally restricted to provide the rearward travel in only one single step. Such restriction causing inconvenience in the change-speed apparatus of a vehicle frequently used in the rearward travel as well, such as a tractor; it has by and by become the practice to provide the forward-and-rearward-travel-shifter mechanism independently of the main change-speed mechanism, as mentioned hereinbefore.

Such independent structure enables the so-called shuttle maneuvering, i.e. maneuvering the forward and rearward running travel shifting while selectively maintaining the multi-step main speed changing in any desired change-speed position, independently of such shifting, thus to make the tractor very convenient in performing the work frequently using the rearward running travel as well. Such structure, provided with the respective maneuvering levers for enabling to independently maneuver the main change-speed mechanism and the forward-and-rearward-travel-shifter mechanism, requires accordingly as a matter of course to frequently repeat maneuvering the said two levers in order to realize a change-speed position as desired in the forward running travel and another change-speed position as may be desired in the rearward running travel.

It has therefore been desired to facilitate the maneuvering of the said two maneuvering levers in such change-speed apparatus capable of realizing the shuttle maneuvering, and to simplify the structure for such maneuvering.

SUMMARY OF THE INVENTION

This invention has as its primary object to facilitate the maneuvering of the said two maneuvering levers in such change-speed apparatus capable of realizing the shuttle maneuvering, as mentioned hereinabove.

A change-speed apparatus for a tractor of this invention is the change-speed apparatus for a tractor, as is constructed for transmitting engine power to running travel apparatuses via a main change-speed mechanism, an auxiliary change-speed mechanism and a forward-and-rearward-travel-shifter mechanism; which is characterized in that the said main change-speed mechanism, forward-and-rearward-travel-shifter mechanism and auxiliary change-speed mechanism are accommodated in a transmission casing in series one after another in the said order in fore-and-aft direction of the machine body, and in that a shifter lever for the said forward-and-rearward-travel-shifter mechanism is disposed in juxtaposition, in transverse direction of the machine body, to a main change-speed lever for maneuvering the said main change-speed mechanism.

Thus, since the main change-speed lever and the maneuvering lever for the forward and rearward running travel shifting are disposed in juxtaposition in the transverse direction of the machine body, it has now been made possible to easily perform the frequent repetition of the change-speed maneuvering and the forward-and-rearward-travel-shifter maneuvering by means for instance of rapidly shifting over the gripping, or the like, without altering in particular the maneuvering posture. Moreover, since the forward-and-rearward-travel-shifter mechanism is disposed immediately rearwardly of the main change-speed mechanism, it has thereby been made possible to make rationally short the distance between the main change-speed lever—which is normally disposed above the main change-speed mechanism—and said forward-and-rearward-travel-shifter mechanism, thus to simplify the structure for the interlocking between the maneuvering lever for shifting the forward-and-rearward-running-travel and the forward-and-rearward-travel-shifter mechanism.

The secondary object of this invention is to restrain the rearward high-speed running travel state as might otherwise be set with the said construction of providing the forward-and-rearward-travel-shifter mechanism separately from the main change-speed mechanism as independent thereof; thus aiming to guarantee to performing the work quite safely.

In order to attain this object, the construction is characterized, in addition to the basic construction as recited hereinbefore, in that a mechanical restraining mechanism is provided, as is automatically shiftable—responsive to the maneuvering of the respective mechanisms recited earlier hereinbefore—to the respective states thereof as are: the state of restraining the maneuvering of the said main change-speed mechanism to its high-speed range side, when the said auxiliary change-speed mechanism is in its high-speed range maneuvering state and when the said forward-and-rearward-travel-shifter mechanism is in the rearward running travel maneuvering state; the state of restraining the maneuvering of the said forward-and-rearward-travel-shifter mechanism to the rearward running travel, when the said auxiliary change-speed mechanism is in its high-speed range maneuvering state and when the said main change-speed mechanism is in its high-speed range maneuvering state; and the state of restraining the maneuvering of the said auxiliary change-speed mechanism to its high-speed range side, when the said forward-and-rearward-travel-shifter mechanism is in the rearward running travel maneuvering state and when the said main change-speed mechanism is in its high-speed range maneuvering state.

Thus, by provision of the restraining mechanism shiftable to any of the three restraining states, it has been realized to make it impossible to maneuver in such manner as to cause dangerous high-speed rearward running travel state with: the auxiliary change-speed mechanism in its high-speed range maneuvering state, the forward-and-rearward-travel-shifter mechanism in the rearward running travel maneuvering state, and the main change-speed mechanism in its high-speed range maneuvering state; and thus it has been made possible to solve the problem as mentioned at the beginning and to therefore realize to enhance the safety. Particularly, since the restraining mechanism is constructed to be of mechanical type automatically shiftable to the respective one of the three restraining states responsive to the maneuvering of the said main change-speed, auxiliary change-speed and forward-and-rearward-travel-shifter mechanisms, it can be constructed less expensively and more simply—in comparison with other structures for instance of the type as to shift over the restrainer between the operative state and the inoperative state thereof, using some electrical driving mechanism, on the basis of the information outputs of some sensors electrically sensing the maneuvering states of the said respective mechanisms, or the like—without requiring any such particular driving mechanism and particular maneuvering-state-sensors; and it has thus great advantage in its practical manufacture.

It has therefore been hereby made possible to provide a work vehicle as may furthermore favorably be used.

Still other objects and advantages of this invention will become apparent from the description to follow hereunder.

BRIEF DESCRIPTION OF THE DRAWINGS

The drawings show, by way of example, an embodiment of the change-speed apparatus for a tractor, according to this invention, wherein:

FIG. 4 is a side elevation of the rearward-high-speed-travel-restraining structure;

DESCRIPTION OF THE PREFERRED EMBODIMENT

Figure 1:
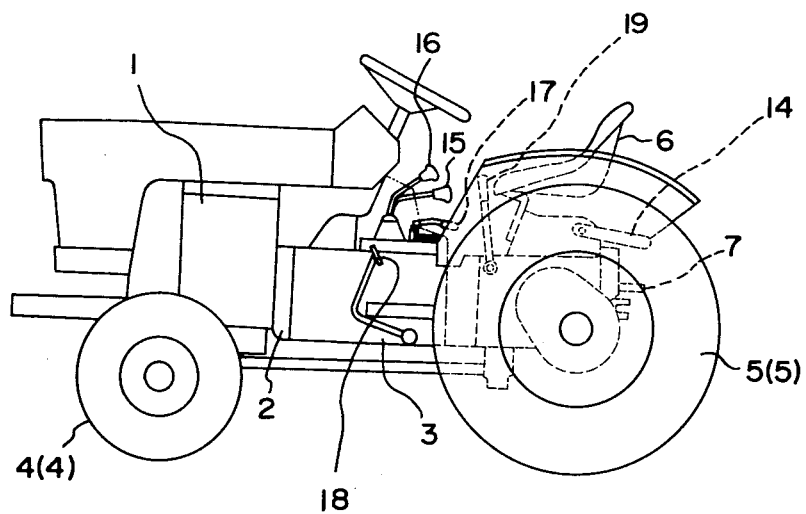
FIG. 1 is an overall side elevation of the tractor.

FIG. 1 shows an agricultural tractor in its entirety, which is constructed with: a machine body framing, made of a frontal Diesel-type engine (1), a clutch housing (2) and a rearward transmission casing (3), as securely connected together; right and left front driving wheels (4),(4) capable of being maneuvered for altering the steering direction, journaled underneath the engine (1); right and left rear driving wheels (5),(5) journaled laterally on both sides of the transmission casing (3); an operation seat (6) mounted above the transmission casing (3); and a PTO-shaft (7) as well as an oilhydraulical-drive-type lift arm (14) for attaching a work implement, respectively journaled and pivoted, both to extend rearwardly of the transmission casing (3); thus for performing the work during the running travel while driving the work implement, attached at the rear of the machine body, such as a cultivation apparatus or the like, by the output power of the PTO-shaft (7).

Figure 2:
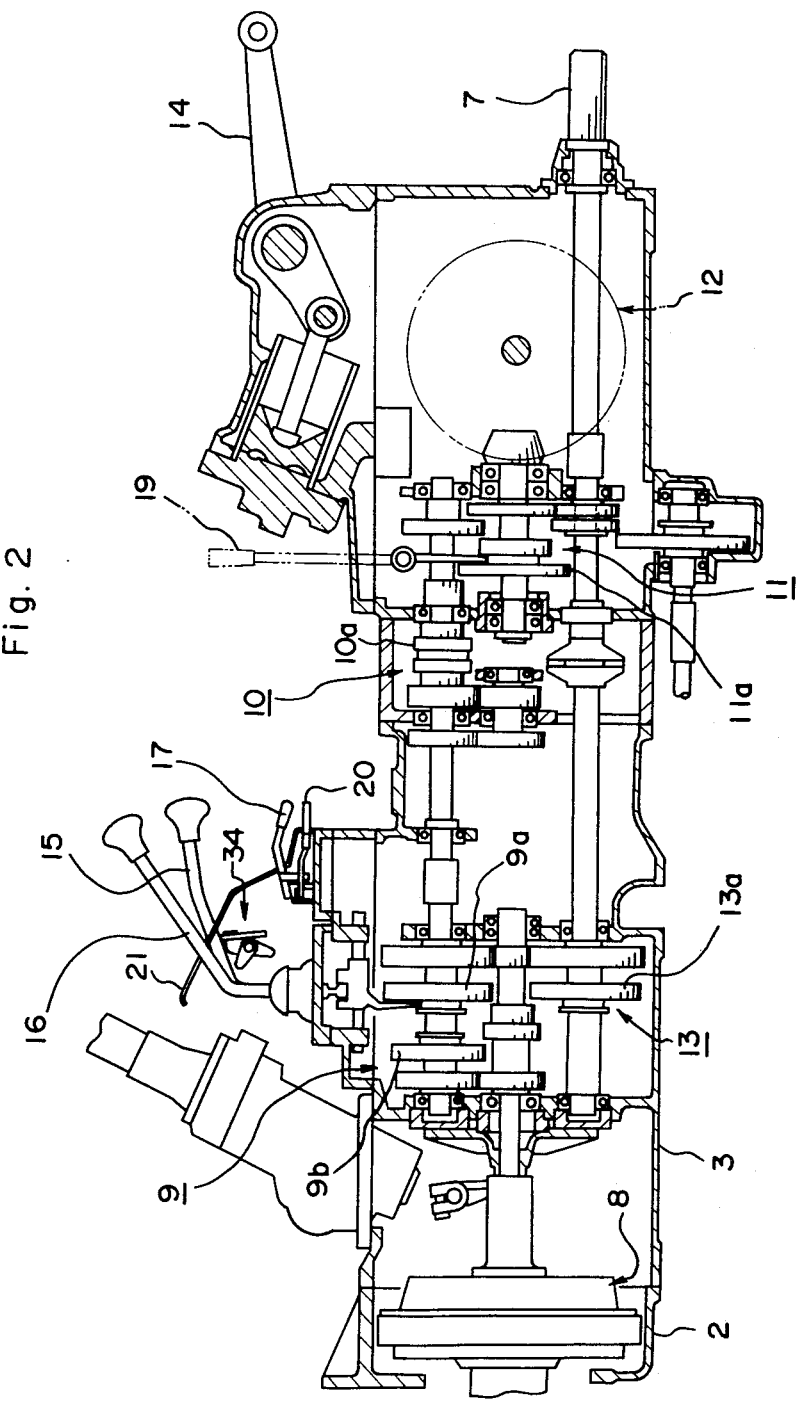
FIG. 2 is a side elevation of the transmission structure.

Within the transmission casing (3), there are provided, as shown in FIG. 2: a main change-speed mechanism (9) for changing speed of the output from a main clutch (8) engaging and disengaging the engine output, in four steps by alternative sliding of two shift gear assemblies (9a),(9b); a forward-and-rearward-travel-shifter mechanism (10) for shifting the output from the main change-speed mechanism (9) respectively to the forward rotation state and the rearward rotation state by sliding of a movable clutch member (10a); an auxiliary change-speed mechanism (11) for transmitting the output from this latest-mentioned mechanism (10), while changing speed in two, namely high and low, steps by sliding of a shift gear assembly (11a), to a differential change-speed mechanism (12) of the rear wheels (5),(5); and a PTO-change-speed mechanism (13) for changing speed of the output from the main clutch (8), in two, namely high and low, steps by sliding of a shift gear assembly (13a).

Above the respective front portions of the transmission casing (3): there are disposed a change-speed lever (15) for the said main change-speed mechanism (9) and a shifter lever (16) for the said forward-and-rearward-travel-shifter mechanism (10), in transversely close juxtaposition, and there also is provided a change-speed lever (17) for the PTO-change-speed mechanism (13). There further are provided: a main clutch pedal (18),(FIG. 1) at a frontward portion on outer surface of a left flank of the transmission casing (3); and a change-speed lever (19), for the auxiliary change-speed mechanism (11), at a rearward portion thereon.

Figure 3:
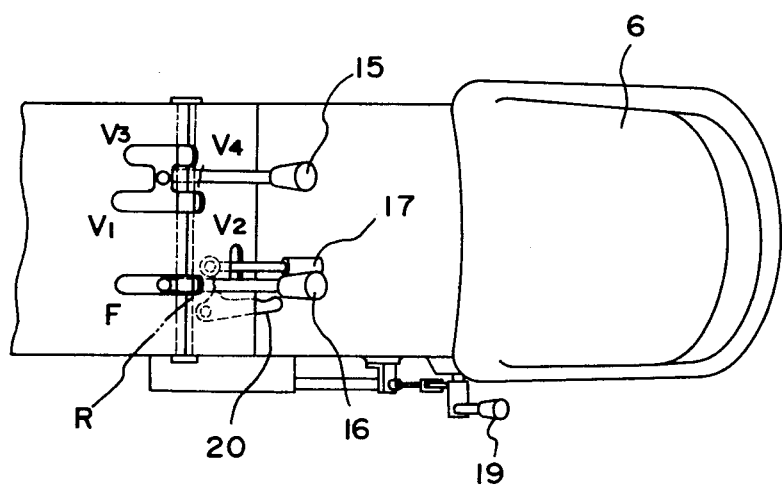
FIG. 3 is a plan view of the running-travel change-speed maneuvering sections.

The main change-speed lever (15) is constructed for maneuvering, as shown in FIG. 3, in movement along a generally H-shaped change-speed slotting with a first speed ($V_1$)/second speed ($V_2$)-shifting slot and a third speed ($V_3$)/fourth speed ($V_4$)-shifting slot, interconnected by a neutral slot; more particularly it is constructed for selecting shift forks respectively for the said shaft gear assemblies (9a),(9b) by right and left rocking movements, respectively, and for shifting back and forth either the thusly selected first/second-speed shift gear assembly (9a) or the third/fourth-speed shift gear assembly (9b). On the otherhand, the forward-and-rearward-travel-shifter lever (16) is for the forward running travel (F) when rocked forward and for the rearward running travel (R) when rocked rearward. Still further, the auxiliary change-speed lever (19) is set so as to be in its high-speed (H) (FIG. 4) when rocked forward, and low-speed (L) when rocked rearward.

Figure 6:
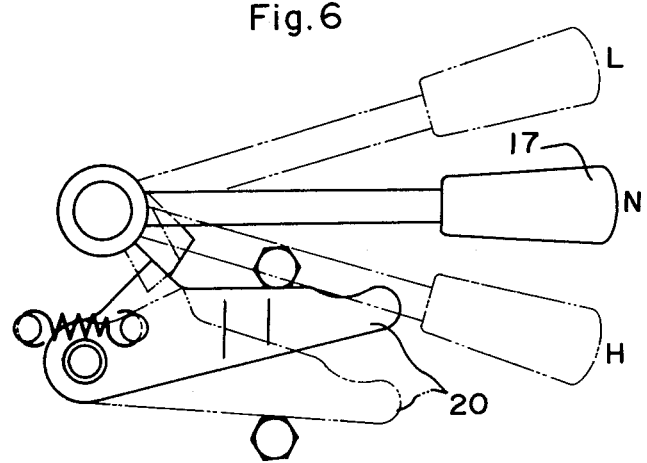
FIG. 6 is a plan view of the PTO-change-speed maneuvering section.

Yet further, the PTO-change-speed lever (17) is set so as to be in its low-speed (L) (FIG. 6) when rocked from the neutral (N) to the right side, and in its high-speed (H) when rocked to the left side. As a member individually separate therefrom, a high-speed-restraining lever (20) is provided as is spring-biased toward the restraint side thereof so as not to allow erroneously shifting the lever (17) into high-speed (H) when driving a low-speed attachment.

By the way, detailed interlocking structures between the said respective levers and the change-speed mechanisms maneuvered thereby are not characteristic of this invention and further discussion is therefore omitted.

Figure 5:
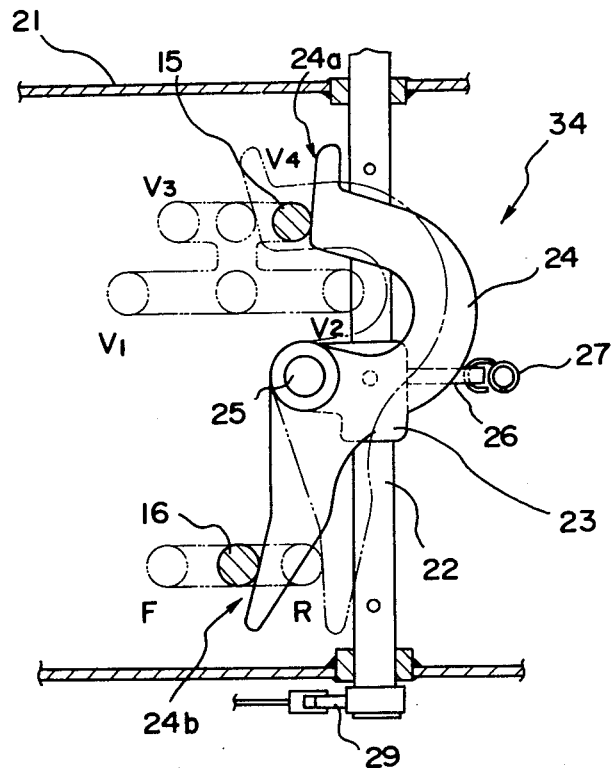
FIG. 5 is a plan view of the rearward-high-speed-travel-restraining structure.

With the running-travel change-speed configuration in accordance with the construction as mentioned above, it is basically possible to effect speed changing in eight steps of forward running and in eight steps of rearward running, but in view that the rearward running (R) with the main change-speed set in its fourth speed ($V_4$) and with the auxiliary change-speed set in its high-speed (H) is dangerous, such change-speed state is restrained as unoccurrable by means of a mechanical restraining mechanism (34) as is now described hereunder:

The said main change-speed lever (15) and forward-and-rearward-travel-shifter lever (16) are mounted both to extend through a lever guide (21) secured on the top surface of the transmission casing (3), and as is shown in FIGS. 4 and 5 a support shaft (22) is journaled on both lateral plates of the lever guide (21), for free rotation, at a position rearwardly upwardly of the respective fulcrums of said levers (15),(16); and on a sleeve (23) fitted on the support shaft (22) to come to an intermediate portion thereof and secured there by a pin, there is pivoted a restrainer member (24) of the shape roughly of a balance via a supporting pin (25) for free rocking thereon. The restrainer member (24) is so constructed that both end portions thereof (24a), (24b) come alternatively into interference respectively with the fourth-speed ($V_4$) position of the main change-speed lever (15) and the rearward-running (R) position of the forward-and-rearward-travel-shifter lever (16).

As is best seen in FIG. 4, a tension spring (27) is tautened with one end hookedly engaged with an arm (26) provided as protruding from the said sleeve (23) and with the other end engaged with a top end portion of the lever guide (21), for biasing the restrainer member (24), consolidatedly with the support shaft (22), to rock rearwards, the rocking movement being limited by abutment of a head portion of the said supporting pin (25) against a stopper (28) provided on the inner surface of the lever guide (21). The construction is so made that when the said restrainer member (24) is thus fully moved rearwards to the rocking limit by the spring (27), then both the right and left end portions (24a),(24b) are retracted sufficiently enough so that they are entirely off said fourth-speed ($V_4$) position and said rearward-running (R) position, thus free from interference therewith, even at any balance-like rocking.

Now, on a tip portion of the support shaft (22) protruding out through the left lateral plate of the lever guide (21) there is securely provided an arm (29), and a drawing pressure cable or a Bowden cable connector (31) is interposedly provided to interconnect the said arm (29) and an arm (30) securely provided at a base portion of the said auxiliary change-speed lever (19). More particularly, inner wire of the said drawing pressure cable (31) is securely connected at the rear end thereof to an intermediary member (33) defining an oblong slit (32), and a lug pin provided on said arm (30) of the auxiliary change-speed lever (19) is fit in this slit (32), providing thereby the construction such that maneuvering of the auxiliary change-speed lever (19) between its low-speed (L) and neutral (N) does not cause any drawing actuation of the inner wire of the drawing pressure cable (31), the said actuation being effected only by maneuvering in shifting over from said neutral (N) to its high-speed (H), when the support shaft (22) is thereby rocked against the spring (27) to thus bring, according thereto, the restrainer member (24) into its forward position where its restraining action for both the juxtaposed levers (15),(16) comes to function actively and effectively. The drawing pressure cable (31) may however be replaced as well by any other suitable link mechanism.

With the restraining structure as above, rearward running (R) with the main change-speed set in its fourth speed ($V_4$) and with the auxiliary change-speed set in its high-speed (H) is restrained, and speaking in more detail, in view that the restrainer member (24) is distanced quite short relative to the axis of the support shaft (22) to thus make it impossible to rockingly rotate the support shaft (22) by the force acting on the restrainer member (24) and to thereby actuate the drawing pressure cable (31); the said restraining function comes actually into effect in the modes as follows:

1. Shifting over of the auxiliary change-speed lever (19) to its high-speed (H) in the state of the main change-speed set in its fourth speed ($V_4$), and in the rearward running (R), requires great maneuvering effort therefor, so there is provided a restraining effect thereagainst. If the auxiliary change-speed lever (19) is nevertheless anyhow forcibly so maneuvered, the main change-speed lever (15) and/or the forward-and-rearward-travel-shifter lever (16) will then be disengaged respectively from the said fourth speed ($V_4$) and/or the said rearward running (R).
2. If the forward-and-rearward-travel-shifter lever (16) is shifted over to the rearward running (R) in the state with the main change-speed set in its fourth speed ($V_4$) and with the auxiliary change-speed set in its high-speed (H), then the main change-speed lever (15) is thereby disengaged from said fourth speed ($V_4$).
3. If the main change-speed lever (15) is brought into engagement in its fourth speed ($V_4$) in the state with the auxiliary change-speed set in its high speed (H), and in the rearward running (R), then the forward-and-rearward-travel-shifter lever (16) is thereby disengaged from said rearward running (R).

Providing the construction, in a transmission apparatus of an agricultural tractor, with a main change-speed mechanism (9), a forward-and-rearward-travel-shifter mechanism (10) and an auxiliary change-speed mechanism (11), as serially interposed in the transmission path in between an engine (1) and running travel apparatuses, as described hereinabove with respect to an embodiment, with: a change-speed lever (15) of the said main change-speed mechanism (9) and a shifter lever (16) of the said forward-and-rearward-travel-shifter mechanism (10), provided as disposed in close juxtaposition; a restrainer member (24) provided for free rocking in a balance-like manner intermediary of both the said levers (15),(16), as is constructed so that both end portions thereof (24a),(24b) come, in accordance with such rocking of this restrainer member (24), alternatively into interference respectively with the fourth-speed ($V_4$) position of the main change-speed lever (15) and the rearward running (R) position of the forward-and-rearward-travel-shifter lever (16); a member (22) provided for free rocking rotation about an axis normal to the rocking axis of the restrainer member (24), as pivotally supporting the restrainer member (24) for free said balance-like rocking thereof; and provision of linking the restrainer-member-supporting member (22) with the auxiliary change-speed lever (19) in such a manner that both free end portions (24a),(24b) of the restrainer member (24) are retracted off the active restraining actuation position thereof when the auxiliary change-speed lever (19) is set in its low-speed (L) and neutral (N) and that the said supporting member (22) is displaced in interlocking with actuation of the auxiliary change-speed lever (19), so that both said free end portions (24a),(24b) of the restrainer member (24) come to the said alternative restraining actuation position, when the auxiliary change-speed lever (19) is set in its high-speed (H); it has thereby been made possible, by such combined interlocking of the restrainer member (24) to rock in a balance-like manner and the member (22) supporting the same, to realize in a simple manner restraining the high speed rearward running travel; and it has in particular been made possible, by providing the restraining member (24) and the supporting member (22) therefor as supported respectively rockably, to have them function smoothly and securely without any plugging or jamming, thus to make up the construction of highly durable restraining structure.

Thus, it has now been made possible, by provision of the restraining function described hereinabove, to effectively prevent the dangerous high speed rearward running travel, while yet sufficiently permitting the multistep rearward running, to therefore guarantee safely performing the work with the vehicle to be frequently used in the rearward running as well, as a frontdozer, frontloader or the like.

We claim:

1. A change-speed apparatus for a tractor, as is constructed for transmitting engine power to running travel apparatuses via a main change-speed mechanism, an auxiliary change-speed mechanism and a forward-and-rearward-travel-shifter mechanism said main change-speed mechanism, forward-and-rearward-travel-shifter mechanism and auxiliary change-speed mechanism are accommodated in a transmission casing in series one after another in the said order in fore-and-aft direction of the machine body, a mechanical restraining mechanism which prevents automatic shifting of said respective change speed mechanism said auxiliary change speed mechanism and said forward and rearward travel shifter mechanism—to the respective states thereof as are: the state of restraining the maneuvering of the said main change-speed mechanism to its high-speed range side, when the said auxiliary change-speed mechanism is in its high-speed range meneuvering state and when the said forward-and-rearward-travel-shifter mechanism is in the rearward running travel maneuvering state; the state of restraining the maneuvering of the said forward-and-rearward-travel-shifter mechanism to the rearward running travel, when the said auxiliary change-speed mechanism is in its high-speed range maneuvering state and when the said main change-speed mechanism is in its high-speed range maneuvering state; and the state of restraining the maneuvering of the said auxiliary change-speed mechanism to its high-speed range side, when the said forward-and-rearward-travel-shifter mechanism is in the rearward running travel maneuvering state and when the said main change-speed mechanism is in its high-speed meneuvering state.

2. The apparatus of claim 1, wherein the said restraining mechanism is constructed with a restrainer member, provided as is shiftable alternatively to a posture for restraining the rearward-running-maneuvering of the said forward-and-rearward-travel-shifter mechanism and another posture for restraining the high-speed-range-maneuvering of the said main change-speed mechanism, and with provision of interlocking the said auxiliary change-speed mechanism and the restrainer member, via a drawing pressure cable, in such a manner as to shift the latter over to its restraint-operative position and to its restraint-released position, respectively under the maneuvering state to the high-speed range side and under the maneuvering state to the low-speed range side of the said auxiliary change-speed mechanism.

3. An apparatus as set forth in claim 1 which includes a shifter lever for the said forward-and-rearward-travel-shifter mechanism disposed in juxtaposition, in transverse direction of the machine body, to a main change-speed lever for maneuvering the said main change-speed mechanism.

4. An apparatus as set forth in claim 2 which includes a shifter lever for the said forward-and-rearward-travel-shifter mechanism disposed in juxtaposition, in transverse direction of the machine body, to a main change-speed lever for maneuvering the said main change-speed mechanism.

5. A change-speed apparatus for a tractor, as is constructed for transmitting engine power to running travel apparatuses via a main change-speed mechanism, an auxiliary change-speed mechanism and a forward-and-rearward-travel-shifter mechanism; said main change-speed mechanism, forward-and-rearward-travel-shifter mechanism and auxiliary change-speed mechanism are accomodated in a transmission casing in series one after another in the said order in fore-and-aft direction of the machine body, a shifter lever for the said forward-and-rearward-travel-shifter mechanism is disposed in juxtaposition, in transverse direction of the machine body, to a main change-speed lever for maneuvering the said main change-speed mechanism, said change-speed lever of the said main change-speed mechanism and the shifter lever of the said forward-and-rearward-travel-shifter mechanism are closely juxtaposed, that a restrainer member is provided for free rocking in a balance-like manner intermediary of both the said levers, as is constructed so that both end portions thereof come, in accordance with such rocking of this restrainer member, alternatively into interference respectively with a fourth-speed ($V_4$) position of the main change-speed lever and the rearward running (R) position of the forward-and-rearward-travel-shifter lever; that a member is provided for free rocking rotation about an axis normal to the rocking axis of the restrainer member, as pivotally supporting the restrainer member for free said balance-like rocking thereof; and that the restrainer-member-supporting member is linked with the auxiliary change-speed lever in such a manner that both free end portions of the restrainer member are retracted off the active restraining actuation position thereof when the auxiliary change-speed lever is set in its low-speed (L) and neutral (N) and that the said supporting member is displaced in interlocking with actuation of the auxiliary change-speed lever, so that both said free end portions of the restrainer member come to the said alternative restraining actuation position, when the auxiliary change-speed lever is set in its high-speed (H).

* * * * *